Aug. 6, 1968    L. BARTOLI ET AL    3,395,874
ACCELEROMETRIC AUTOMATIC PILOT FOR MISSILES
Filed July 21, 1966

INVENTORS
LANFRANCO BARTOLI
CLAUDIO FONDI
BY
Amster & Rothstein
ATTORNEYS

United States Patent Office 3,395,874
Patented Aug. 6, 1968

3,395,874
ACCELEROMETRIC AUTOMATIC PILOT
FOR MISSILES
Lanfranco Bartoli and Claudio Fondi, Rome, Italy, assignors to Contraves Italiana S.p.A., Rome, Italy
Filed July 21, 1966, Ser. No. 566,908
Claims priority, application Italy, July 31, 1965
17,443/65
1 Claim. (Cl. 244—3.2)

ABSTRACT OF THE DISCLOSURE

A missile pitch control using acceleration measuring devices strategically located in the front and rear sections of the missile, the pitch being a function of the difference in the signals produced by the aforesaid strategically located devices.

The invention relates to accelerometric automatic pilots for missiles. Almost all such prior art devices have gyrometers for damping the pitching of the missile around its centre of gravity. The disadvantages of automatic pilots having gyrometers are that they are very expensive, not very reliable, rather complicated in operation, take a considerable time before they reach the necessary speed before the launching of the missile, and are sensitive to storage conditions and to the atmosphere in which they are transported and stored.

It is an object of the invention to obviate these disadvantages.

To this end, the invention provides an accelerometric automatic pilot which mainly performs the following two functions:

(a) It makes the transverse acceleration of a missile produced by the rotation of its electrically controlled surfaces proportional to such control and only slightly dependent on the Mach number and other aerodynamic variables, such as dynamic pressure;

(b) It produces a control to damp the pitching of the missile around its centre of gravity.

More particularly, the accelerometric automatic pilot according to the invention is characterised in that it comprises two accelerometers spaced out over the longitudinal axis of the missile and connected to the input of the servo control device via a negative feedback network which comprises a first adder which establishes the difference between the signals of the two accelerometers, a second adder which establishes the total of the signal from the first accelerometer and the difference signal supplied by the first adder, and a third adder which establishes the total of the control signal and the signal supplied by the second adder.

The difference signal is conveniently filtered before being applied to the adder.

The difference between the two aforestated accelerometric signals is a measurement of the angular acceleration of pitching; integration of intelligence signals correlative to such acceleration leads to a signal proportional to the angular velocity of pitching, such signal being very well adapted to damp the pitching.

Figure 1:
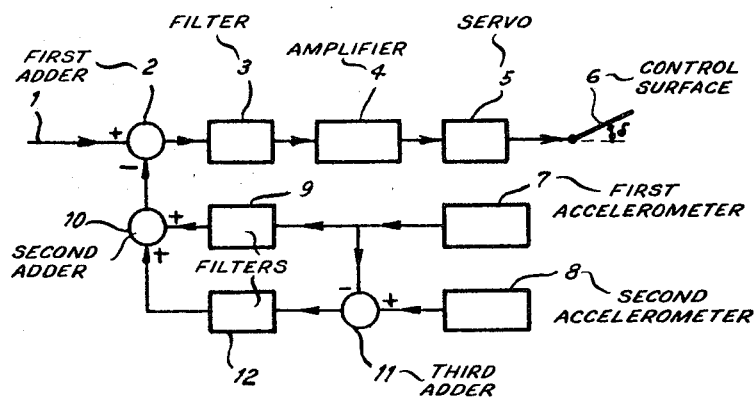
Figure 2:
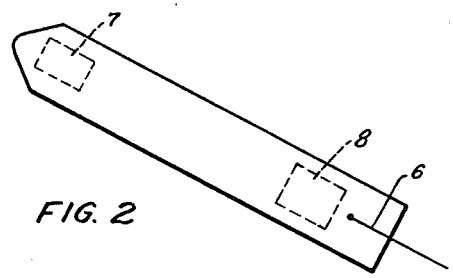

The invention will be better understood from the following description of a purely exemplary non-limitative embodiment of an accelerometric automatic pilot, with reference to the accompanying drawings wherein:

FIG. 1 is a block diagram of the circuitry used in missile pitch control of the present invention, and FIG. 2 is a diagrammatic illustration of a missile showing the advantageous locations of accelerometers used in the circuit of FIG. 1.

The drawing shows an automatic pilot comprising a line 1, connected to an electric signal generator controlled by the transverse acceleration of the missile of FIG. 2, the line 1 being also connected via an adder 2, a conventional resistance and capacity network filter 3 and an amplifier 4 to the input of a servo control device actuating a servodynamic control surface 6. Spaced out along the longitudinal axis of the missile are first accelerometer 7 and a second accelerometer 8. The accelerometer 7 is connected via a second conventional filter 9 and an adder 10 to the adder 2. The accelerometer 8 is connected via an adder 11 and a third conventional combination integrator and filter 12 to the adder 10. The output of the accelerometer 7 is also connected to one of the inputs of the adder 11. The adders 2, 10, 11 form a negative feedback network interposed between the accelerometers 7, 8 and the servo control device 6.

The accelerometric automatic pilot according to the invention operates as follows:

The control signal transmitted from the line 1 is intended to produce in the missile a transverse acceleration proportional to the control signal.

But for the accelerometric negative feedback network, the electric control signal would produce a proportional rotation of the aerodynamic surface, but such rotation would lead to transverse accelerations of the missile which would vary with the aerodynamic values (Mach number, dynamic pressure) or with the mass of the missile.

This disadvantage is obviated by the accelerometric automatic pilot according to the invention, since the operation of the accelerometer 7 and the negative feedback network 9, 10, 2 produces in the missile an acceleration proportional to the electric guide control and independent of the aerodynamic quantities. The automatic pilot according to the invention, with the known negative feedback described, would have the disadvantage of only slightly damping the pitching of the missile. To damp such pitching, a second accelerometer 8 is used which is disposed some distance from the accelerometer 7 in the longitudinal direction of the missile.

The transverse acceleraion is measured in the two accelerometers 7, 8 so as to produce two signals which are subtracted from one another in the adder 11 to produce a difference signal. After filtration and integration of the input angular acceleration signals into an output angular velocity signal in the filter 12, the difference signal is added to the signal from the accelerometer 7 and therefore forms the negative feedback which damps missile pitching, and the signal thus produced at the adder 10 is subtracted from the electric control signal at the adder 2. The difference signal obtained at the output from the adder 2 is filtered in the filter 3, amplified in the filter 4 and applied to the servo control device 5, which performs the correct rotation of the control surface 6. The circuit described hereinbefore operates satisfactorily as long as the missile only rolls slightly. The accelerometric automatic pilot according to the invention is therefore particularly suitable for use on missiles having a system for controlling the angle of roll.

While only one embodiment of the invention has been described hereinbefore, it is obvious that many changes and modifications can be made therein without departing from the scope of the invention.

We claim:

1. In combination, a missile of the type having a movable aerodynamic surface responsive to an electrical signal for correcting any pitching of the missile during flight and a control circuit operatively effective to produce a correcting electrical signal to operate said aerodynamic surface, said control circuit comprising a first and a second accelerometer of the type producing electrical signals and having respective operative positions adjacent the front and rear sections of said missile and electrically connected so as to produce a first difference electrical signal from their respectively produced electrical signals which is a function of the difference in the rate of acceleration of the front and rear sections of said missile during pitching movement thereof, means for electrically adding said first difference electrical signal to said electrical signal of one said accelerometer to produce a first additive electrical signal, means for producing a control electrical signal, and means for electrically adding said first additive electrical signal to said control electrical signal to produce said first named correcting electrical signal.

References Cited

UNITED STATES PATENTS

| | | | |
|---|---|---|---|
| 2,770,452 | 11/1956 | Miller | 244—3.20 |
| 2,959,347 | 11/1960 | Kearns | 244—3.20 |
| 2,984,435 | 5/1961 | Faith et al. | 244—3.20 |
| 3,087,333 | 4/1963 | Newell | 244—3.2 |
| 3,143,319 | 8/1964 | Gorham et al. | 244—3.15 |
| 3,158,339 | 11/1964 | Woodbury et al. | 244—3.15 |

BENJAMIN A. BORCHELT, *Primary Examiner.*

T. H. WEBB, *Assistant Examiner.*